United States Patent [19]

Conseur

[11] 4,422,347

[45] Dec. 27, 1983

[54] TORSIONAL BALANCER DEVICE WITH A VISCOUS DAMPING MEDIUM

[75] Inventor: Joachim Conseur, Berlin, Fed. Rep. of Germany

[73] Assignee: Carl Hasse & Wrede GmbH, Berlin, Fed. Rep. of Germany

[21] Appl. No.: 268,264

[22] Filed: May 29, 1981

[30] Foreign Application Priority Data

Jun. 3, 1980 [DE] Fed. Rep. of Germany ....... 3020993

[51] Int. Cl.$^3$ ............................................. F16F 15/10
[52] U.S. Cl. ..................................................... 74/574
[58] Field of Search ................ 73/526; 64/27; 74/574, 74/591, 594.5, 604

[56] References Cited

U.S. PATENT DOCUMENTS 4,210,234 7/1980 Jones ..................................... 74/574

FOREIGN PATENT DOCUMENTS 2738376 2/1978 Fed. Rep. of Germany ........ 74/574
2079893 1/1982 United Kingdom .................. 74/574
714084 8/1980 U.S.S.R. ................................ 74/574

*Primary Examiner*—Patrick D. Lawson
*Attorney, Agent, or Firm*—Edmund M. Jaskiewicz

[57] ABSTRACT

A torsional balancer device for a rotary shaft such as for a piston engine comprises a rotationally symmetrical member which is adapted to be connected to the rotary shaft to be balanced. A rotationally symmetrical seismic mass is rotatably mounted so as to be closely spaced from the rotational member and a viscous damping agent is within the small gaps between the seismic mass and the symmetrical member.

A plurality, preferably an odd number, of curved, substantially closed spring elements have closely spaced ends which are connected respectively to the rotational member and the seismic mass. The spring elements define closed curves which may be circular or elliptical in shape. The rotationally symmetrical member may comprise a hermetically sealed annular housing and the seismic mass and damping agent may be enclosed within the housing.

8 Claims, 5 Drawing Figures

TORSIONAL BALANCER DEVICE WITH A VISCOUS DAMPING MEDIUM

The present invention relates to a torsional balancer device for a rotary shaft such as for a piston engine or the like, more particularly, to a spring structure for supporting a rotationally symmetrical seismic mass with respect to a rotationally symmetrical member adapted to be connected to the rotary shaft.

Torsional balancer devices have been used for damping undesired torsional vibrations and oscillations of rotating shafts, particularly crank shafts of piston engines. Such balancer devices have also been known as harmonic balancers. The balancer device essentially comprises an annular seismic mass surrounded by a viscous damping agent and mounted for resilient peripheral movement in a hermetically closed housing which is adapted to the shaft to be balanced. Such balancer devices have also been constructed in the reverse of the above-described construction in that the seismic mass is positioned exteriorly of the balancer and encloses the rotationally symmetrical member or other flange structure which is to be connected to the shaft to be balanced.

Such balancers are generally constructed with the annular seismic mass or flywheel being resiliently supported by a spring arrangement so that the mass is freely moveable in a peripheral direction within a damping agent enclosed in a housing. In DE-OS2 818 295 such an annular seismic mass is supported by leaf springs wherein a number of radially disposed spiral springs are fastened on one side to the hub of the balancer housing and to the other side to the outer periphery of the annular flywheel. This construction has the disadvantage that the spiral springs pass radially through openings in the flywheel so that a considerable portion of the seismic mass is lost. In addition, the points or areas on the springs which are attached must transmit moments of a large magnitude and thus require expensive construction and occupy considerable space.

In another form of the torsional balancer such as in DE-OS2 818 296 the annular flywheel is mounted by spiral springs which comprise guide springs having relatively large surfaces which in turn occupy a considerable portion of the space in the balancer housing which space should more effectively be utilized by the seismic mass. In addition, the springs have the further disadvantage that even though they are expensive to construct and manufacture they do not adequately guide the annular flywheel in the direction of the shaft which is to be balanced.

It is therefore the principal object of the present invention to provide a novel and improved torsional balancer device of the type described herein.

It is another object of the present invention to provide an improved spring structure for supporting the seismic mass with respect to the rotationally symmetrical member adapted to be connected to the shaft to be balanced.

It is a further object of the present invention to support and guide the seismic mass of such a torsional balancer device by springs which are largely independent of the size of the balancer device, require a minimum of space, require relatively small clamping moments and thus the clamping or attachment of the springs is relatively modest.

According to one aspect of the present invention a torsional balancer device for a rotary shaft or the like may comprise a rotationally symmetrical member which is adapted to be connected to a rotary shaft to be balanced. A rotationally symmetrical seismic mass is rotatably mounted closely spaced from the rotational member so as to define gap spaces therebetween. A viscous damping agent is within the gap spaces. A plurality of curved, substantially closed spring elements have closely spaced ends which are connected respectively to the rotational member and the seismic mass.

The spring element ends may be disposed in an axial plane of the balancer and are directed toward each other. The ends may either be in different radii of the balancer or aligned in the same radius of the balancer. According to the present invention the rotationally symmetrical member may comprise a hermetically sealed annular housing which encloses the seismic mass and the damping agent or the seismic mass may be constructed as an exterior component of the balancer and enclose the symmetrical member which is connected to the rotary shaft to be balanced.

The seismic mass is thus guided and precisely centered by preferably an odd number but at least 3 springs each of which has one end fastened to the hub and the other end attached to the seismic mass. Of the 6 possible degrees of freedom of relative motion of an object, the spring arrangement permits only small rotary vibrations or oscillations about the common axis of rotation and the other 5 degrees of freedom are blocked. The springs which are bent to resemble a spiral are mounted in a longitudinal or axial plane of the balancer and thus precisely and rigidly support and guide the seismic mass radially and axially. However, the spring structure does permit freedom of the seismic mass in peripheral or rotational vibration.

The actual length of a pure spiral spring which can be utilized depends on several parameters which include the impressed angle of vibration of the seismic mass, the loads which are statically and dynamically supported, the flexural strength of the spring material, and the process by means of which the spring was produced. This structural length to which must be further added any extensions for the fastening or attaching ends of the spring is difficult to accommodate in a torsional balancer of the usual or conventional diameter/width ratio. The springs become smaller when they can also be stressed in torsion as well as by bending. The present invention thus discloses how space in the balancer can be saved by shaping the springs to carry out all of the desired functions for such a spring mount while at the same time only a relatively small proportion of the effective seismic mass must be sacrificed.

The clamping moments of the guide springs become zero when the clamping or attaching ends of the springs coincide at a single point. The present invention closely approaches this theoretical requirement in that the attaching points of the springs are positioned as close together as physically possible. Because of the small moments to which the attachment points of the springs are subjected the fastening of the springs can be relatively simple and compact.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
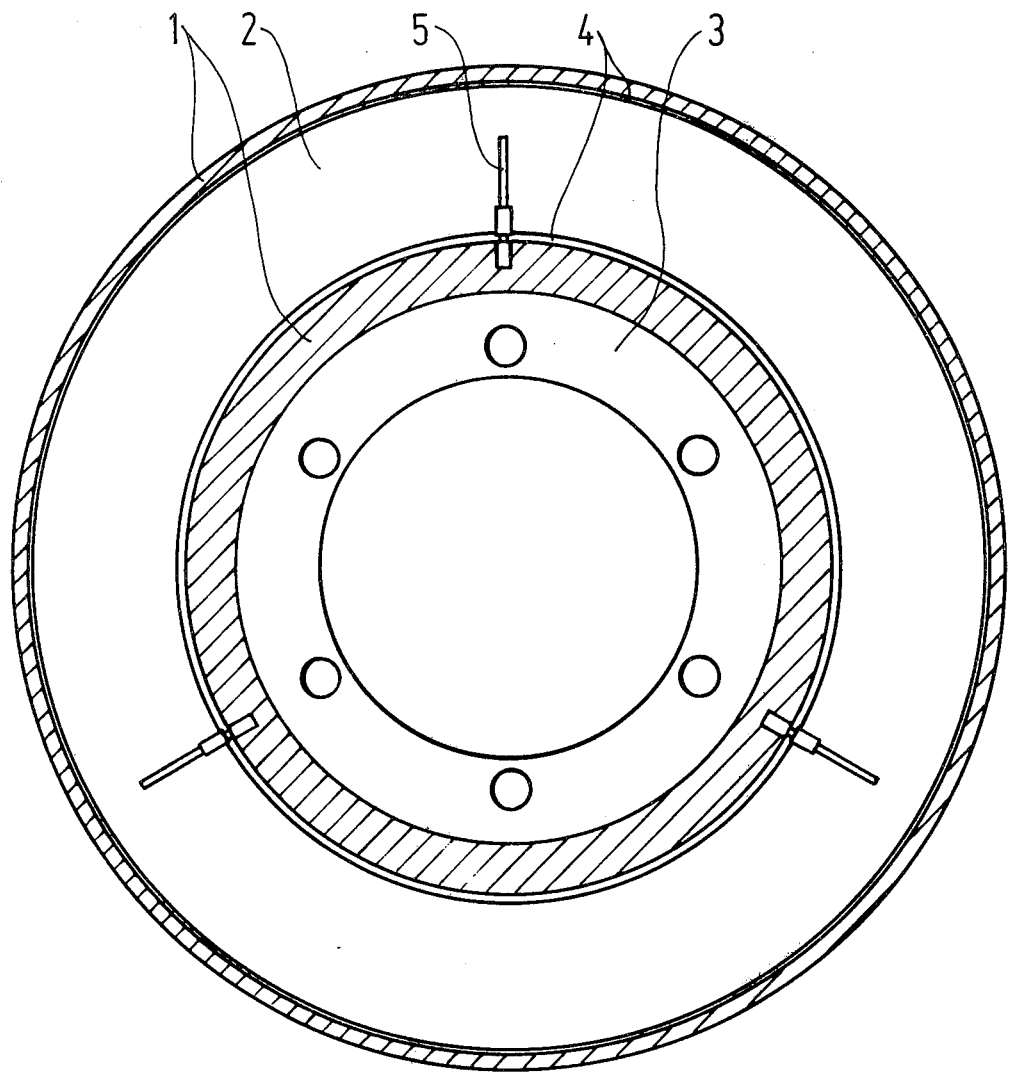
FIG. 1 is a sectional view taken along a radial plane of a torsional balancer device according to the present invention.
Figure 2:
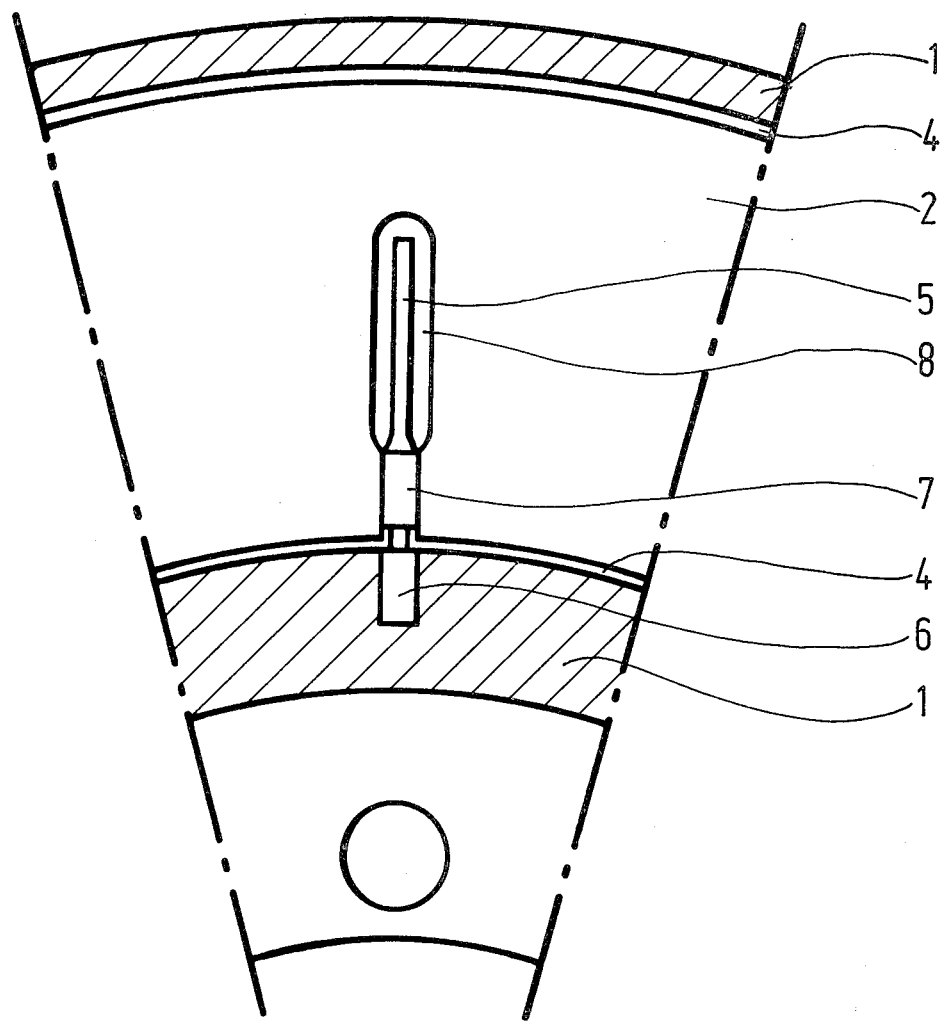
FIG. 2 is a portion of FIG. 1 but in enlarged scale to show additional details of the spring mounting.

As may be seen in FIG. 1, the torsional balancer according to the present invention comprises an annular housing 1 attached to or formed integral with a flange 3 which is mounted radially inwardly of the housing and is provided with a central bore therethrough for mounting coaxially upon a rotary shaft which is to be balanced. The flange 3 may be provided with a plurality of holes for bolts to attach the balancer device to a suitable mounting flange or other structure on the shaft, which may be a crank shaft of a piston engine, in a manner known in the art.

Figure 3:
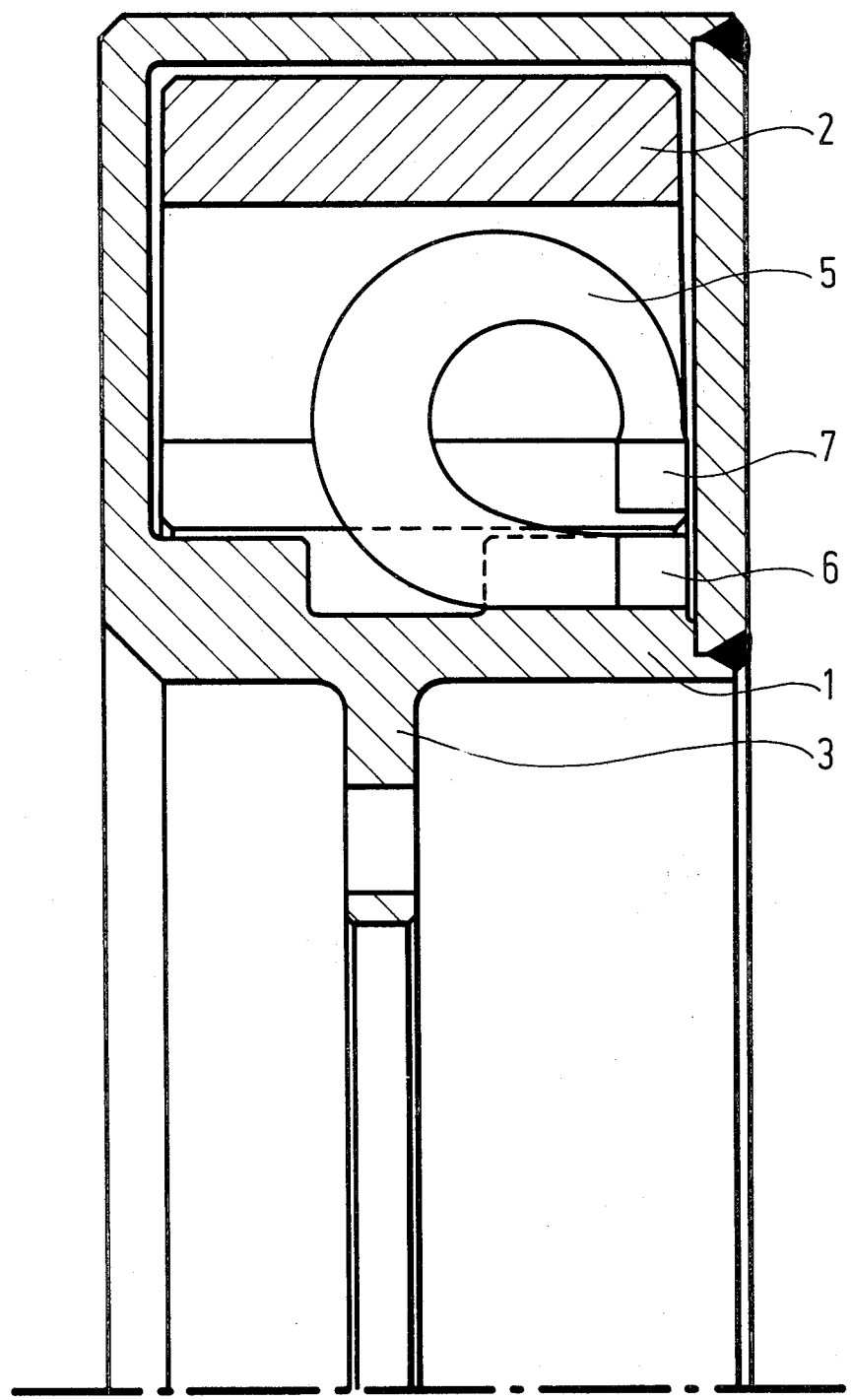
FIG. 3 is a sectional view taken axially through FIG. 2.

The housing 1 has substantially a C-type cross section as may be seen in FIG. 3 and one face of the housing is closed by an annular plate so that the housing is hermetically sealed and encloses therein an annular seismic mass 2 in the form of a rotatable ring. The seismic mass 2 is dimensioned to be closely spaced from the inner and outer peripheral surfaces of the housing and from the side walls of the housing so as to form peripheral and side gaps 4 which are of the magnitude of a few tenths of a millimeter. These gaps are filled with a suitable viscous damping agent as known in the art.

In operation, the torsional device which is connected to a shaft rotates about its axis of rotation and the annular flywheel 2 will undergo relatively small angular oscillations with respect to the housing 1. During these oscillations the viscous damping agent in the gap 4 is subjected to relatively small alternating shearing stresses. In addition, the ring 2 may rotate very slowly with respect to the housing 1 in a direction of rotation which is usually not known in advance.

Figure 4:
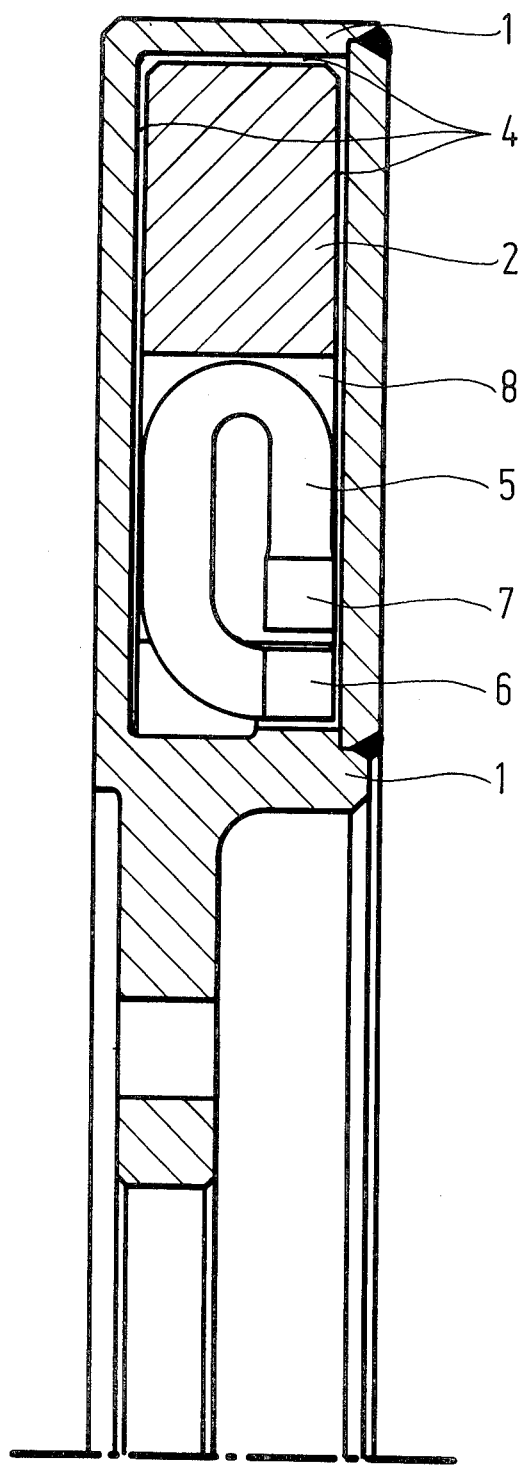
FIG. 4 is a view similar to that of FIG. 3 but showing a torsional balancer with a relatively narrow housing.

The torsional balancer according to the invention has three guide or mounting springs 5 which are spaced equidistantly as may be seen in FIG. 1 and shown in further details in FIGS. 3 and 4. Other arrangements of the springs 5 may be employed but it is preferable that the total number of springs is an odd number in order to equalize radial stresses.

Each spring 5 is preferably made of a flat strip and formed into a closed curve which may be substantially circular as seen in FIG. 3 or substantially elliptical as seen in FIG. 4. The ends 6 and 7 of each spring 5 are closely spaced apart and have a maximum gap therebetween of about 2 mm. One end 6 of a spring is attached to the inner periphery of the housing 1 and the other end 7 of a spring is attached to the flywheel 2. To reduce notch stresses at the transition from the ends to the main portion of each spring the ends or jaws 6 and 7 have greater thicknesses than the spring itself and the transition from each end to the spring is carefully rounded and curved as known in the art.

The spring ends 6 and 7 are attached or fastened so as to be immovable and secure against vibration in the housing 1 and seismic mass 2 in several different ways. The ends may be press-fitted into longitudinally or axially extending grooves in the housing and seismic mass, the ends may be soldered, fastened or connected in some other manner by the addition of a suitable material into grooves in which the spring ends are received with a small degree of play or clearance, or the spring ends may be fastened to the respective components of the torsional balancer by electron beam or laser beam welding.

The main body of each spring 5 is received within a hollow chamber or cavity 8 formed in the seismic mass 2 so as to permit the spring to deform in an unhindered way and to be free from constraint under the influence of the rotational vibration.

In FIG. 3, each spring 5 has a substantially circular shape which is preferable since this shape requires the smallest quantity of material. However, the torsional balancer must be of a sufficient width or its axial dimension must be such so as to readily accommodate such a circular spring. The ends or attaching jaws 6 and 7 are closely adjacent to each other other in a radial direction and are secured in axially parallel grooves formed in the housing 1 and seismic mass 2.

While the housing 1 shown in FIG. 3 has a tightly welded cover, it is to be understood that in accordance with the present invention a welded housing may have a substantially L-shaped cross section with a suitably fitted cover member thereon. Housing may also be made with a removeable cover which may be attached by means of bolts or screws. The construction of the housing must be such so as to provide a hermetically sealed housing with the seismic mass 2 located internally of the housing.

In a torsional balancer with a precisely spring-guided secondary or seismic mass, the operating gaps 4 are so dimensioned that the alternate shear stressing of the damping medium is of equal magnitude on each surface element. The width of the gap may increase as the radius of the balancer increases.

The balancer of FIG. 4 is constructed with a relatively narrow width or axial dimension in order to be accommodated in a smaller space. The circular spring 5 is thus provided with an elongated closed curve which is substantially elliptically shaped and extends radially outwardly. The ends 6 and 7 of the springs are also positioned adjacent to each other along a radius of the balancer so that the moments to which the ends of the spring are subjected are relatively small.

Figure 5:
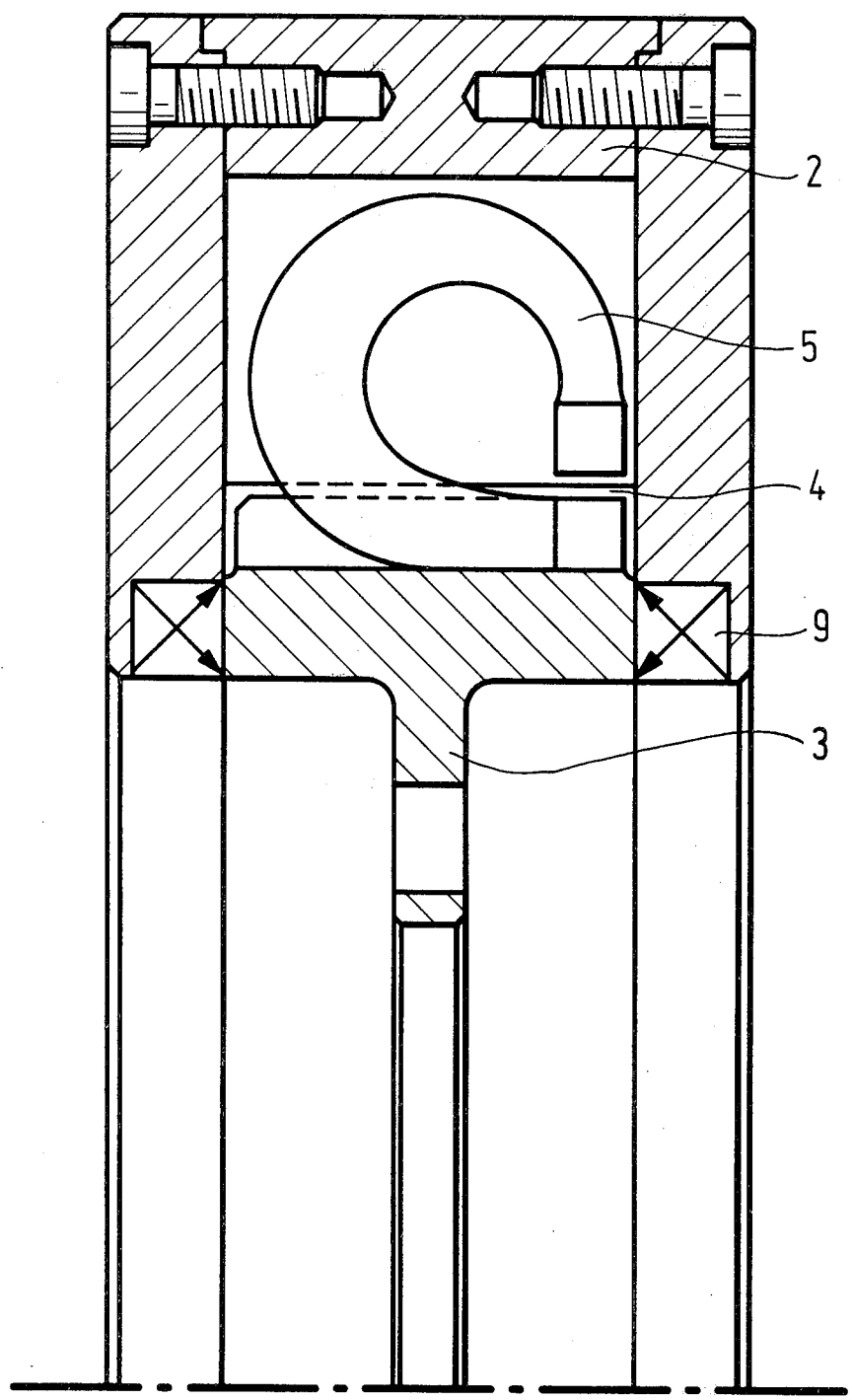
FIG. 5 is a view similar to that of FIG. 3 but showing a modification of the balancer wherein the seismic mass is exterior of the balancer and encloses the mounting flange on the primary member of the balancer.

The present invention can also be applied and the guide springs 5 disposed herein can also be utilized in a torsional balancer when the seismic mass 4 is located exteriorly in the radial and axial directions and executes relative vibrations with respect to the flange 3. Such a construction is shown in FIG. 5. Since the working gaps 4 are also filled with a viscous damping medium, two sliding seals are required between the flange 3 and the external seismic mass 2. The resilient and damping action of the damping medium in the working gap 4 can be increased as needed and by known means such as by providing additional shearing faces or displacement chambers.

While the ends 6 and 7 of the springs are shown to be disposed along substantially the same radius of the torsional balancer, according to the present invention these ends may be disposed along slightly different radii of the balancer.

Thus it can be seen that according to the present invention the seismic mass is attached to the primary mass of the balancer by a number of springs which guide and support the seismic mass with respect to the primary mass. These springs are in the form of a closed curve so that the ends which are respectively attached to the primary and secondary masses are relatively close to each other or a distance of the order of 2 mm or less. The springs thus occupy a minimum of space but accurately guide and support the seismic mass during its peripheral or rotational oscillations with respect to the primary mass.

It will be understood that this invention is susceptible to modification in order to adopt it to different usages and conditions, and accordingly, it is desired to comprehend such modifications within this invention as may fall within the scope of the appended claims.

What is claimed is:

1. A torsional balancer device for a rotary shaft and the like, comprising a rotationally symmetrical member having means thereon for connecting said member to a rotary shaft to be balanced, a rotationally symmetrical seismic mass rotatably mounted closely spaced from said rotational member and defining gap spaces therebetween, a viscous damping agent in said gap spaces, and a plurality of curved, substantially closed spring elements, each having closely spaced ends connected respectively to said rotational member and said seismic mass, said ends of each spring element are disposed in an axial plane of the balancer and are directed toward each other.

2. A torsional balancer device as claimed in claim 1 wherein said ends have a maximum distance of about 2 mm therebetween.

3. A torsional balancer device as claimed in claim 1 wherein said ends are disposed in different radii of the balancer.

4. A torsional balancer device as claimed in claim 1 wherein said ends are disposed on the same radius of the balancer.

5. A torsional balancer device as claimed in claim 1 wherein the ends of said spring elements are press fitted into axially extending grooves in the respective rotational member and seismic mass.

6. A torsional balancer device as claimed in claim 1 wherein the ends of said spring elements are attached to the respective rotational member and seismic mass by the addition of an adhering material.

7. A torsional balancer device as claimed in claim 1 wherein the ends of said spring elements are adhered to the respective rotational member and seismic mass by one of electron beam and laser beam welding.

8. A torsional balancer device as claimed in claim 1 wherein said plurality of springs consists of an odd number.

* * * * *